United States Patent
Hemphill et al.

(10) Patent No.: US 9,593,724 B2
(45) Date of Patent: Mar. 14, 2017

(54) INTEGRATED PISTON BEARING

(71) Applicant: Schaeffler Technologies AG & Co. KG, Herzogenaurach (DE)

(72) Inventors: Jeffrey Hemphill, Copley, OH (US); Vural Ari, Peabody, MA (US)

(73) Assignee: Schaeffler Technologies AG & Co., Herzogenaurach (DE)

( * ) Notice: Subject to any disclaimer, the term of this patent is extended or adjusted under 35 U.S.C. 154(b) by 75 days.

(21) Appl. No.: 14/633,199

(22) Filed: Feb. 27, 2015

(65) Prior Publication Data

US 2015/0267760 A1 Sep. 24, 2015

Related U.S. Application Data

(60) Provisional application No. 61/955,477, filed on Mar. 19, 2014.

(51) Int. Cl.
| | | |
|---|---|---|
| *F16D 25/08* | (2006.01) |
| *F16D 13/52* | (2006.01) |
| *F16D 13/70* | (2006.01) |
| *F16D 23/14* | (2006.01) |

(52) U.S. Cl.
CPC ......... *F16D 25/083* (2013.01); *F16D 13/52* (2013.01); *F16D 13/70* (2013.01); *F16D 23/14* (2013.01); *F16D 25/082* (2013.01); *F16D 2300/08* (2013.01)

(58) Field of Classification Search
CPC ....... F16D 25/08; F16D 25/082; F16D 25/083
See application file for complete search history.

(56) References Cited

U.S. PATENT DOCUMENTS

| | | | | |
|---|---|---|---|---|
| 3,070,202 A | * | 12/1962 | Banker ............... | F16D 25/0638 192/113.5 |
| 3,684,069 A | * | 8/1972 | Pray ..................... | F16D 25/082 192/110 B |
| 3,800,928 A | * | 4/1974 | Pray ..................... | F16D 25/082 192/110 B |
| 4,646,889 A | * | 3/1987 | Hoffman .............. | F16D 25/082 138/40 |
| 5,234,090 A | * | 8/1993 | Haka .................... | F16D 25/082 188/196 P |
| 5,735,376 A | * | 4/1998 | Moroto ............... | C03C 17/3639 192/110 B |
| 5,931,275 A | * | 8/1999 | Kasuya ................ | F16D 25/082 192/109 R |
| 6,612,414 B2 | | 9/2003 | Giroire | |
| 7,066,077 B2 | | 6/2006 | Schnapp et al. | |

(Continued)

*Primary Examiner* — Richard Lorence
*Assistant Examiner* — David Morris
(74) *Attorney, Agent, or Firm* — Kevin L. Parks

(57) ABSTRACT

A transmission clutch assembly includes at least one rotatable clutch plate or friction plate, a reaction plate, a non-rotatable piston, at least one bearing roller, and a cage. The reaction plate is arranged to rotate with and apply a force to the at least one rotatable clutch plate or friction plate. The non-rotatable piston is arranged for sealing engagement with a transmission housing. The at least one bearing roller arranged between and contactable with the reaction plate and the piston to permit relative rotational motion therebetween. The cage is for positioning the at least one roller and is retained by the reaction plate or the piston.

19 Claims, 2 Drawing Sheets

(56) References Cited

U.S. PATENT DOCUMENTS

| | | | | |
|---|---|---|---|---|
| 8,640,844 B2* | 2/2014 | Kuwahara | ............ | F16D 25/082 |
| | | | | 192/113.5 |
| 9,080,612 B2* | 7/2015 | Fujii | ................... | F16D 25/082 |
| 9,234,551 B2* | 1/2016 | Heitzenrater | ........... | F16D 23/14 |
| 2010/0075794 A1* | 3/2010 | McConnell | ......... | F16H 61/0206 |
| | | | | 475/146 |
| 2013/0175134 A1* | 7/2013 | Boyes | .................... | F16D 23/12 |
| | | | | 192/75 |
| 2013/0313063 A1* | 11/2013 | Fujii | ...................... | F16D 13/72 |
| | | | | 192/66.3 |

* cited by examiner

INTEGRATED PISTON BEARING

FIELD

The invention relates generally to a transmission clutch assembly, and more specifically to a transmission clutch assembly with an integrated piston bearing.

BACKGROUND

Transmission clutch assemblies are known. Pistons for known assemblies may be configured to rotate with the endmost clutch plate to prevent relative motion and wear between the piston and clutch plate during engagements. Often times it is necessary to seal the rotating piston to another component that is not rotating or rotating at a different speed, requiring the use of a dynamic seal. Dynamic seals may be less effective at sealing than static seals.

BRIEF SUMMARY

Example aspects broadly comprise a transmission clutch assembly with at least one rotatable clutch plate or friction plate, a reaction plate, a non-rotatable piston, at least one bearing roller, and a cage. The reaction plate is arranged to rotate with and apply a force to the at least one rotatable clutch plate or friction plate. The non-rotatable piston is arranged for sealing engagement with a transmission housing. The at least one bearing roller arranged between and contactable with the reaction plate and the piston to permit relative rotational motion therebetween. The cage is for positioning the at least one roller and is retained by the reaction plate or the piston.

In some example embodiments, the transmission clutch assembly includes a clutch carrier rotationally engaged with the rotatable clutch plate or friction plate and a spring compressively engaged with the clutch carrier and the reaction plate to urge the reaction plate away from the rotatable clutch plate or friction plate. In some example embodiments, the reaction plate includes a first radial portion contactable with the rotatable clutch plate or friction plate and the at least one bearing roller, and a second radial portion contactable with the spring. In an example embodiment, the first radial portion is radially inside of the second radial portion.

In an example embodiment, the cage includes a circumferential ring, the piston includes a circumferential ring with a radial bump at a distal end, and the cage circumferential ring is retained by the radial bump. In some example embodiments, the piston includes an over-molded seal element affixed to a back surface of the piston. In an example embodiment, the over-molded seal element includes an axial protrusion for limiting a disengagement travel of the piston. In an example embodiment, the over-molded seal element includes a pair of flexible rings for sealing with inner and outer portions of the housing, respectively.

In an example embodiment, the cage includes a circumferential ring, the reaction plate includes a circumferential ring with a radial bump at a distal end, and the cage circumferential ring is retained by the radial bump. In some example embodiments, the piston includes first and second segments fixed to one another and providing a pair of o-ring grooves. In an example embodiment, the piston first segment contacts the at least one bearing roller and the second segment includes an axial protrusion for limiting a disengagement travel of the piston. In an example embodiment, the piston includes a pair of o-rings for sealing with inner and outer portions of the housing, respectively.

Other example aspects broadly comprise a transmission assembly including a housing, a non-rotatable piston, a clutch pack, a reaction plate, and a bearing element. The non-rotatable piston is sealed to the housing at radially inner and outer seals. The clutch pack is installed in a rotatable carrier. The reaction plate is for engaging the clutch pack. The bearing element has a roller contactable with the piston and the reaction plate and a cage fixed to one of the piston or the reaction plate. In some example embodiments, the transmission assembly includes a release spring installed between the rotatable carrier and the reaction plate to disengage the clutch pack.

In some example embodiments, the non-rotatable piston includes an overmolded seal with an axial protrusion for contacting the housing to limit a disengagement travel of the piston. In an example embodiment, the overmolded seal includes inner and outer sealing elements in contact with inner and outer circumferential surfaces of the housing. In some example embodiments, the piston includes a pair of fixed plates and one of the plates includes an axial protrusion for contacting the housing to limit a disengagement travel of the piston. In an example embodiment, the piston includes inner and outer o-ring seals disposed in grooves formed by the pair of fixed plates and in contact with inner and outer circumferential surfaces of the housing.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
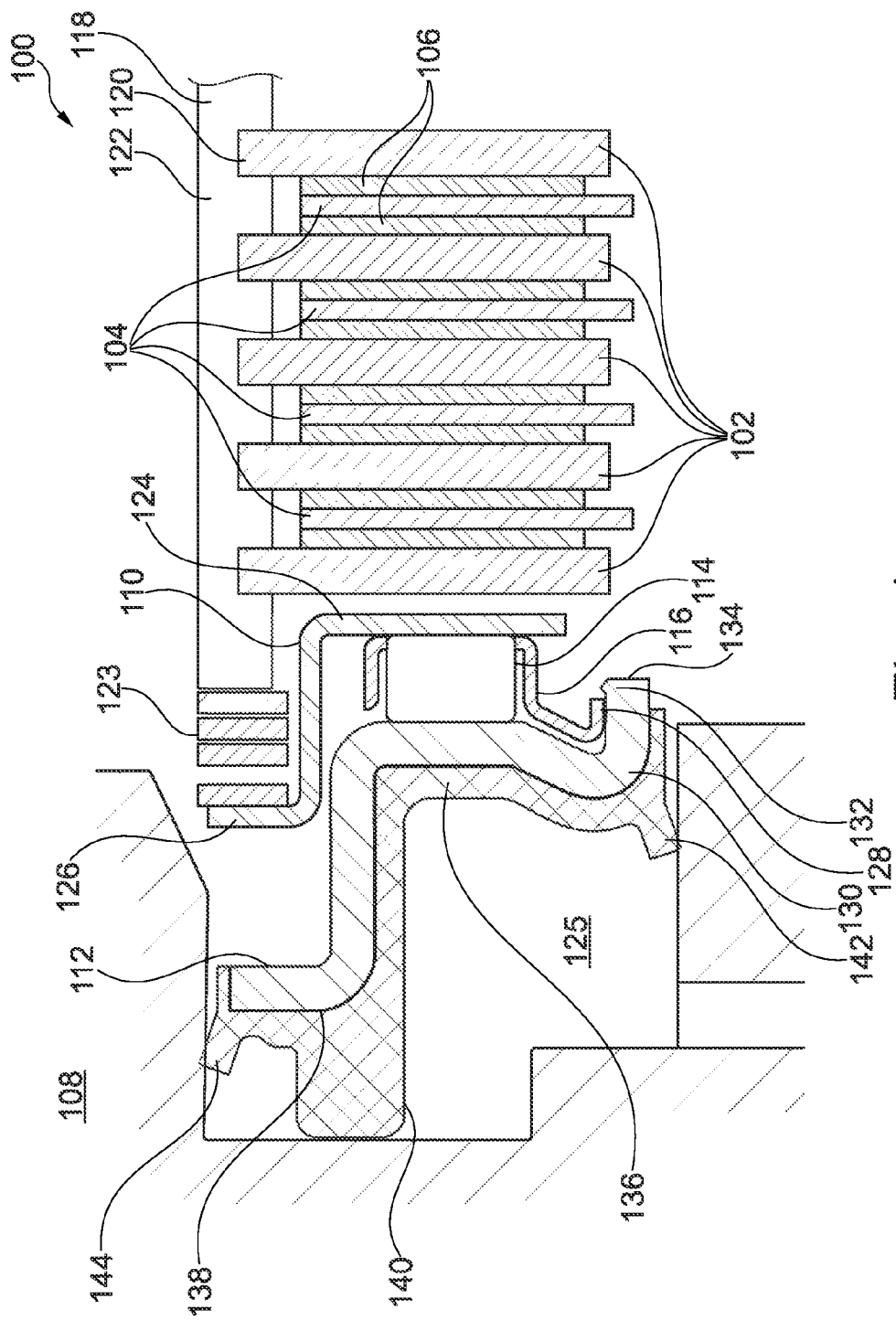
FIG. 1 is a cross section view of a first embodiment of a transmission clutch assembly according to an example aspect.

The following description is made with reference to FIG. 1. FIG. 1 is a cross section view of transmission clutch assembly 100 according to an example aspect. Transmission clutch assembly 100 is a portion of a transmission assembly and includes clutch plates 102 and friction plates 104 which may be collectively referred to as a clutch pack. Friction plates 104 include friction material rings 106 on each side.

Clutch plates 102 are rotatable with respect to housing 108 for the transmission. Although five clutch plates and four friction plates are shown, other numbers of clutch plates and friction plates are possible.

Transmission clutch assembly 100 includes reaction plate 110, piston 112, bearing roller 114, and cage 116. Reaction plate 110 is arranged to rotate with and apply a force to clutch plate 102, although in other embodiments, plate 110 may apply a force to one of friction plates 104. In other words, the reaction plate is for engaging the clutch pack. Piston 112 is non-rotatable with respect to housing 108 and sealed to housing 108. During normal operation of clutch pack 100, piston 112 does not rotate in the housing, allowing for a robust sealing and decreased leakage at the seal, thereby reducing pumping losses. Rotating pistons require dynamic seals that are known to have increased leakage.

Bearing roller 114 is arranged between and contactable with the reaction plate and the piston to permit relative rotational motion therebetween. Bearing roller 114 is one of a plurality of cylindrical rollers arranged to roll between the reaction plate and piston during relative rotation between the two components. Cage 116 is for retaining and positioning rollers 114 radially and maintaining proper spacing in a circumferential direction. Cage 116 is retained by piston 112 as described below. The bearing roller and cage may be collectively referred to as a bearing element.

Clutch carrier 118 is rotationally engaged with clutch plate 102. That is the clutch plate has an external toothed portion 120 engaged with a carrier internal complementary spline portion 122 so that the clutch plate and carrier rotate in unison but the clutch plate can still move axially in the carrier to engage the clutch. Otherwise stated, the clutch pack is installed in the rotatable carrier. Rearmost clutch plate 102 is axially retained by a carrier feature or snap ring (not shown). Release spring 123 is installed between and compressively engaged with the clutch carrier and the reaction plate to urge the reaction plate away from the clutch plate. That is, without sufficient hydraulic pressure in chamber 125 formed by housing 108 and piston 112 to engage the clutch, spring 123 will disengage the clutch.

Reaction plate 110 includes radial portion 124 contactable with the rotatable clutch plate on one side and the bearing roller on the other side. Reaction plate 110 includes radial portion 126 contactable with the spring. Portion 124 is radially inside of portion 126. Portion 126 may also include a toothed portion (not shown) engaged with clutch carrier spline portion 122 so that the reaction plate and the clutch carrier are rotationally connected.

Cage 116 includes circumferential ring 128. Piston 112 includes circumferential ring 130 with radial bump 132 at distal end 134. Cage ring 128 is retained by radial bump 132. That is, the cage is retained on the piston and prevented from being removed by the bump. The bump may be a pre-formed feature in which case the cage would be snapped onto the piston, or the bump may be formed after the cage is installed onto the piston by staking or the like.

Piston 112 includes over-molded seal element 136 affixed to back surface 138 of the piston. That is, the seal is bonded to the piston. Over-molded seal element 136 includes axial protrusion 140 for limiting a disengagement travel of the piston. Over-molded seal element 136 includes flexible rings 142 and 144 for sealing with inner and outer portions, or circumferential surfaces, of the housing, respectively. In other words, rings 142 and 144 are radially inner and outer seals, respectively.

During an engagement, hydraulic pressure in chamber 125 urges piston 112 towards the clutch pack. An axial force from the piston acts on bearing roller 114, which in-turn acts on reaction plate 110, overcoming force from spring 123. The reaction plate presses against clutch plate 102 to clamp the clutch pack and engage the clutch. Because the reaction plate and the clutch plate are both rotationally fixed to the clutch carrier and rotate together, there is no relative motion between the two components. In other embodiments, the two may not be rotationally connected but friction from spring 123 acting on the reaction plate and the clutch carrier keeps the two at a similar rotational speed. Bearing roller 114 effectively rotationally disconnects the piston from the rotating reaction plate so that the piston is not rotating and can use conventional static seals against the non-rotating housing.

Figure 2:
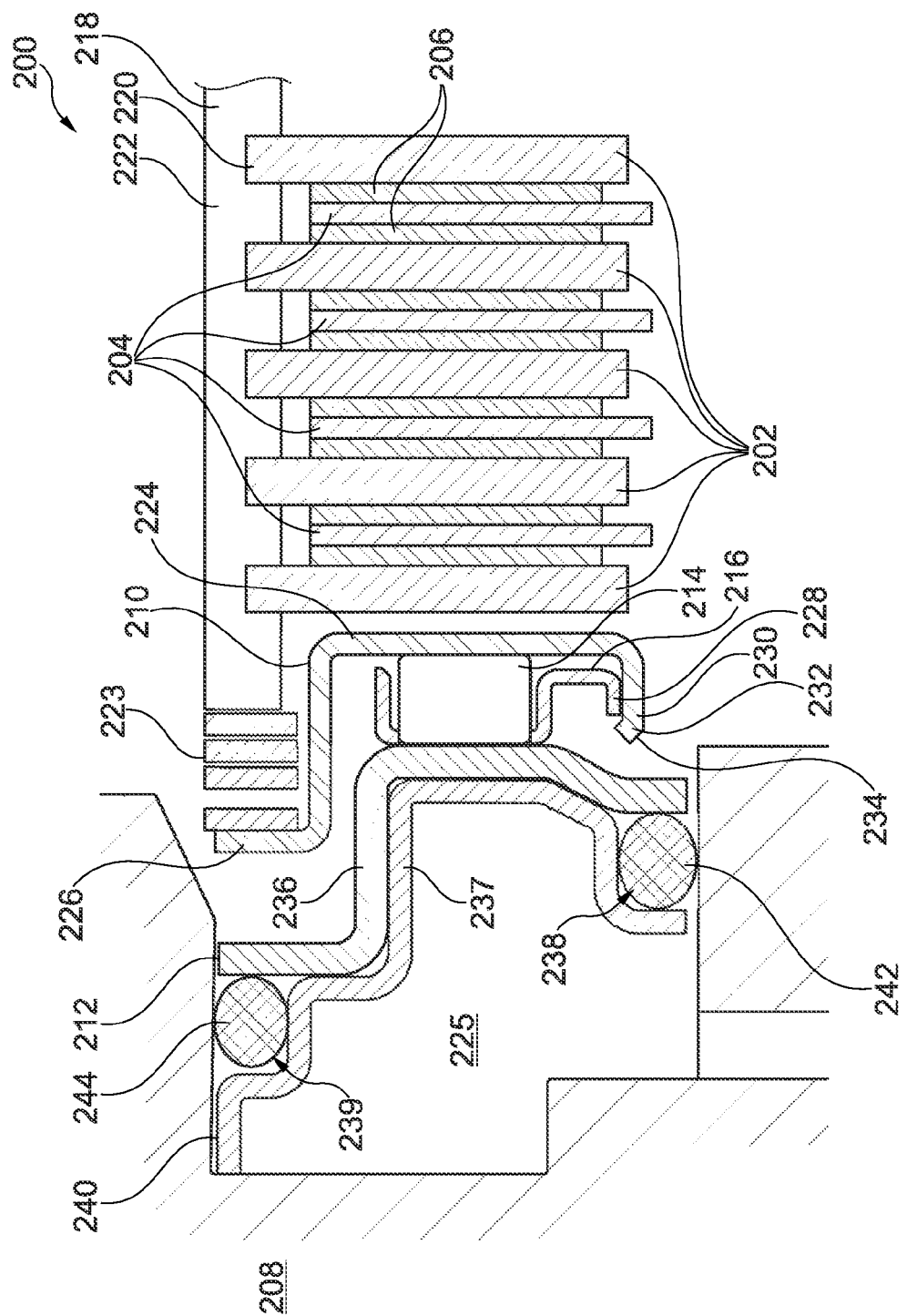
FIG. 2 is a cross section view of a second embodiment of a transmission clutch assembly according to an example aspect.

The following description is made with reference to FIG. 2. FIG. 2 is a cross section view of transmission clutch assembly 200 according to an example aspect. Transmission clutch assembly 200 includes clutch plates 202 and friction plates 204 which may be collectively referred to as a clutch pack. Friction plates 204 include friction material rings 206 on each side. Clutch plates 202 are rotatable with respect to housing 208 for the transmission. Although five clutch plates and four friction plates are shown, other numbers of clutch plates and friction plates are possible.

Transmission clutch assembly 200 includes reaction plate 210, piston 212, bearing roller 214, and cage 216. Reaction plate 210 is arranged to rotate with and apply a force to clutch plate 202, although in other embodiments, plate 210 may apply a force to one of friction plates 204. In other words, the reaction plate is for engaging the clutch pack. Piston 212 is non-rotatable with respect to housing 208 and sealed to housing 208. During normal operation of clutch pack 200, piston 212 does not rotate in the housing, allowing for a robust sealing and decreased leakage at the seal, thereby reducing pumping losses.

Bearing roller 214 is arranged between and contactable with the reaction plate and the piston to permit relative rotational motion therebetween. Bearing roller 214 is one of a plurality of cylindrical rollers arranged to roll between the reaction plate and piston during relative rotation between the two components. Cage 216 is for retaining and positioning rollers 214 radially and maintaining proper spacing in a circumferential direction. Cage 216 is retained reaction plate 210 as described below. The bearing roller and cage may be collectively referred to as a bearing element.

Clutch carrier 218 is rotationally engaged with clutch plate 202. That is the clutch plate has an external toothed portion 220 engaged with a carrier internal complementary spline portion 222 so that the clutch plate and carrier rotate in unison but the clutch plate can still move axially in the carrier to engage the clutch. Otherwise stated, the clutch pack is installed in the carrier. Rearmost clutch plate 202 is axially retained by a carrier feature or snap ring (not shown). Release spring 223 is installed between and compressively engaged with the clutch carrier and the reaction plate to urge the reaction plate away from the clutch plate. That is, without sufficient hydraulic pressure in chamber 225 formed by housing 208 and piston 212 to engage the clutch, spring 223 will disengage the clutch.

Reaction plate 210 includes radial portion 224 contactable with the rotatable clutch plate on one side and the bearing roller on the other side. Reaction plate 210 includes radial portion 226 contactable with the spring. Portion 224 is radially inside of portion 226. Portion 226 may also include a toothed portion (not shown) engaged with clutch carrier spline portion 222 so that the reaction plate and the clutch carrier are rotationally connected.

Cage 216 includes circumferential ring 228. Reaction plate 210 includes circumferential ring 230 with radial bump 232 at distal end 234. Cage ring 228 is retained by radial bump 232. That is, the cage is retained on the reaction plate and prevented from being removed by the bump. The bump may be a pre-formed feature in which case the cage would be snapped onto the reaction plate, or the bump may be formed after the cage is installed onto the reaction plate by staking or the like.

Piston 212 includes segments, or plates, 236 and 237 fixed to one another and providing a pair of o-ring grooves 238 and 239. Segments 236 and 237 may be fixed together by press-fitting or riveting, for example. Segment 236 is contactable with bearing roller 214 and segment 237 includes axial protrusion 240 for limiting a disengagement travel of piston 212. Piston 212 includes o-rings 242 and 244 installed in grooves 238 and 239, respectively, for sealing with inner and outer portions, or circumferential surfaces, of the housing, respectively. In other words, o-rings 242 and 244 are radially inner and outer seals, respectively.

During an engagement, hydraulic pressure in chamber 225 urges piston 212 towards the clutch pack. An axial force from the piston acts on bearing roller 214, which in-turn acts on reaction plate 210, overcoming force from spring 223. The reaction plate presses against clutch plate 202 to clamp the clutch pack and engage the clutch. Because the reaction plate and the clutch plate are both rotationally fixed to the clutch carrier and rotate together, there is no relative motion between the two components. In other embodiments, the two may not be rotationally connected but friction from spring 223 acting on the reaction plate and the clutch carrier keeps the two at a similar rotational speed. Bearing roller 214 effectively rotationally disconnects the piston from the rotating reaction plate so that the piston is not rotating and can use conventional static seals against the non-rotating housing.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A transmission clutch assembly comprising:
   at least one rotatable clutch plate or friction plate;
   a reaction plate arranged to rotate with and apply a force to the at least one rotatable clutch plate or friction plate;
   a non-rotatable piston arranged for sealing engagement with a transmission housing;
   at least one bearing roller arranged between and contactable with the reaction plate and the piston to permit relative rotational motion therebetween; and,
   a cage for positioning the at least one roller and retained by the reaction plate or the piston.

2. The transmission clutch assembly of claim 1 further comprising:
   a clutch carrier rotationally engaged with the rotatable clutch plate or friction plate; and,
   a spring compressively engaged with the clutch carrier and the reaction plate to urge the reaction plate away from the rotatable clutch plate or friction plate.

3. The transmission clutch assembly of claim 2 wherein the reaction plate includes a first radial portion contactable with the rotatable clutch plate or friction plate and the at least one bearing roller, and a second radial portion contactable with the spring.

4. The transmission clutch assembly of claim 3 wherein the first radial portion is radially inside of the second radial portion.

5. The transmission clutch assembly of claim 1 wherein:
   the cage includes a circumferential ring;
   the piston includes a circumferential ring with a radial bump at a distal end; and,
   the cage circumferential ring is retained by the radial bump.

6. The transmission clutch assembly of claim 1 wherein the piston includes an over-molded seal element affixed to a back surface of the piston.

7. The transmission clutch assembly of claim 6 wherein the over-molded seal element includes an axial protrusion for limiting a disengagement travel of the piston.

8. The transmission clutch assembly of claim 6 wherein the over-molded seal element includes a pair of flexible rings for sealing with inner and outer portions of the housing, respectively.

9. The transmission clutch assembly of claim 1 wherein:
   the cage includes a circumferential ring;
   the reaction plate includes a circumferential ring with a radial bump at a distal end; and,
   the cage circumferential ring is retained by the radial bump.

10. The transmission clutch assembly of claim 1 wherein the piston includes first and second segments fixed to one another and providing a pair of o-ring grooves.

11. The transmission clutch assembly of claim 10 wherein the piston first segment contacts the at least one bearing roller and the second segment includes an axial protrusion for limiting a disengagement travel of the piston.

12. The transmission clutch assembly of claim 10 wherein the piston includes a pair of o-rings for sealing with inner and outer portions of the housing, respectively.

13. A transmission assembly comprising:
    a housing;
    a non-rotatable piston sealed to the housing at radially inner and outer seals;
    a clutch pack installed in a rotatable carrier;
    a reaction plate for engaging the clutch pack; and,
    a bearing element:
       including a roller contactable with the piston and the reaction plate; and,
       a cage fixed to one of the piston or the reaction plate.

14. The transmission assembly of claim 13 further comprising a release spring installed between the rotatable carrier and the reaction plate to disengage the clutch pack.

15. The transmission assembly of claim 14 wherein the non-rotatable piston includes an overmolded seal with an axial protrusion for contacting the housing to limit a disengagement travel of the piston.

16. The transmission assembly of claim 15 wherein the overmolded seal includes inner and outer sealing elements in contact with inner and outer circumferential surfaces of the housing.

17. The transmission assembly of claim 14 wherein the piston includes a pair of fixed plates and one of the plates includes an axial protrusion for contacting the housing to limit a disengagement travel of the piston.

18. The transmission assembly of claim 17 wherein the piston includes inner and outer o-ring seals disposed in grooves formed by the pair of fixed plates and in contact with inner and outer circumferential surfaces of the housing.

19. A transmission clutch assembly comprising:
at least one rotatable clutch plate or friction plate;
a reaction plate arranged to rotate with and apply a force to the at least one rotatable clutch plate or friction plate;
a non-rotatable piston arranged for sealing engagement with a transmission housing;
at least one bearing roller arranged between and contactable with the reaction plate and the piston to permit relative rotational motion therebetween; and,
a cage for positioning the at least one roller and retained by the reaction plate or the piston, wherein:
  the cage includes a circumferential ring;
  the piston or the reaction plate includes a circumferential ring with a radial bump at a distal end; and,
  the cage circumferential ring is retained by the radial bump.

* * * * *